(12) United States Patent

Hamilton et al.

(10) Patent No.: US 12,664,421 B2

(45) Date of Patent: Jun. 23, 2026

(54) MACHINE LEARNING MODELS WITH EFFICIENT FEATURE LEARNING

(71) Applicant: EQUIFAX INC., Atlanta, GA (US)

(72) Inventors: Howard H. Hamilton, Atlanta, GA (US); Jeffery Dugger, Atlanta, GA (US)

(73) Assignee: Equifax Inc., Atlanta, GA (US)

( * ) Notice: Subject to any disclaimer, the term of this patent is extended or adjusted under 35 U.S.C. 154(b) by 1000 days.

(21) Appl. No.: 17/815,688

(22) Filed: Jul. 28, 2022

(65) Prior Publication Data

US 2023/0046601 A1 Feb. 16, 2023

Related U.S. Application Data

(60) Provisional application No. 63/231,631, filed on Aug. 10, 2021.

(51) Int. Cl.
G06N 3/08 (2023.01)
G06N 3/09 (2023.01)
(Continued)

(52) U.S. Cl.
CPC ................. G06N 3/08 (2013.01); G06N 3/09 (2023.01); G06Q 10/0635 (2013.01); H04W 12/67 (2021.01)

(58) Field of Classification Search
CPC ............ G06N 3/08; G06N 3/048; G06N 3/09; G06N 3/0464; G06Q 10/04; G06Q 10/0635

See application file for complete search history.

(56) References Cited

U.S. PATENT DOCUMENTS

| | | | | |
|---|---|---|---|---|
| 10,515,304 | B2 * | 12/2019 | Towal | G06N 3/08 |
| 11,966,930 | B1 * | 4/2024 | Posert | G06N 3/04 |

(Continued)

FOREIGN PATENT DOCUMENTS

| | | | | |
|---|---|---|---|---|
| CN | 110674979 | A * | 1/2020 | G06Q 10/0635 |

OTHER PUBLICATIONS

Yan, L1 Norm Regularization and Sparsity Explained for Dummies, Aug. 2016 (Year: 2016).*

(Continued)

*Primary Examiner* — Tamara T Kyle
*Assistant Examiner* — Jacqueline C. Meyer
(74) *Attorney, Agent, or Firm* — Kilpatrick Townsend & Stockton LLP

(57) ABSTRACT

A method can be used to predict risk using machine learning models having efficient feature learning. A risk prediction model can be applied to time-series data associated with a target entity to generate a risk indicator. The risk prediction model can include a feature learning model for generating features from the time-series data. The risk prediction model can also include a risk classification model for generating the risk indicator. The feature learning model can include filters and can be trained. Parameters of the risk prediction model can be adjusted to minimize a loss function associated with risk indicators. An updated risk prediction model can be generated by removing a filter from an original set of filters based on influencing scores of the original filters. The risk indicator can be transmitted to a computing device for use in controlling access of the target entity to a computing environment.

18 Claims, 13 Drawing Sheets

(51) Int. Cl.
    *G06Q 10/0635*     (2023.01)
    *H04W 12/67*     (2021.01)

(56)                References Cited

U.S. PATENT DOCUMENTS

| | | | | |
|---|---|---|---|---|
| 2018/0357559 | A1* | 12/2018 | Truong | .................. G06N 20/00 |
| 2020/0357060 | A1* | 11/2020 | Dalinina | .............. G06F 18/213 |
| 2021/0400075 | A1* | 12/2021 | Stergioudis | ......... H04L 63/1433 |

OTHER PUBLICATIONS

Li et al., Pruning Filters for Efficient ConvNets, Mar. 2017 (Year: 2017).*

Anwar et al., Structured Pruning of Deep Convolutional Neural Networks, Jul. 2017 (Year: 2017).*

Gandhi et al., Dynamically Adding and Removing Neurons from Neural Networks, 2018 (Year: 2018).*

Hu et al., Network Trimming: A Data-Driven Neuron Pruning Approach towards Efficient Deep Architectures, Jul. 2016 (Year: 2016).*

Liang et al., Filter Pruning-based Two-step Feature Map Reconstruction, Mar. 2021 (Year: 2021).*

Wu et al., Differential Evolution Based Layer-Wise Weight Pruning for Compressing Deep Neural Networks, Jan. 2021 (Year: 2021).*

\* cited by examiner

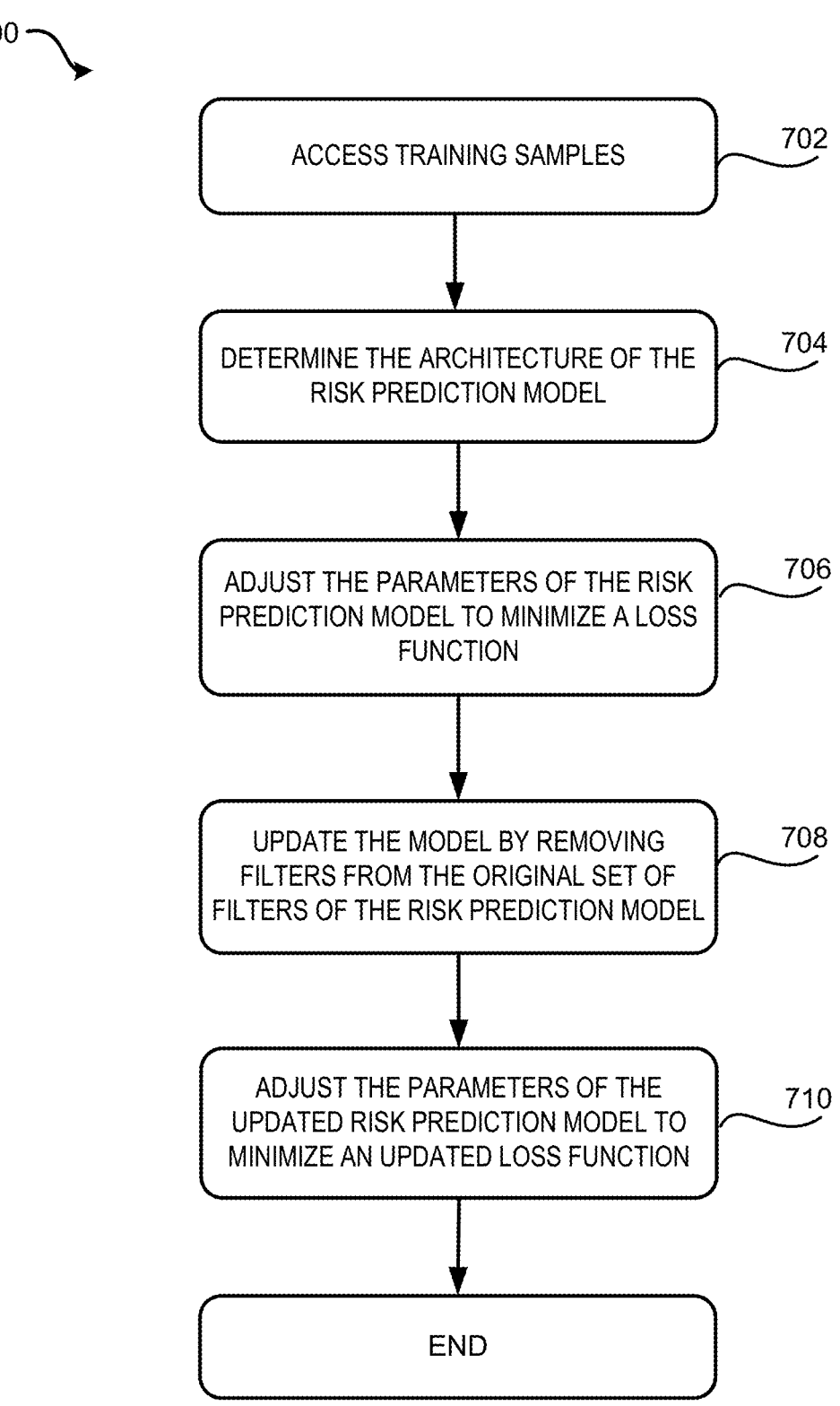

700

ACCESS TRAINING SAMPLES — 702

DETERMINE THE ARCHITECTURE OF THE RISK PREDICTION MODEL — 704

ADJUST THE PARAMETERS OF THE RISK PREDICTION MODEL TO MINIMIZE A LOSS FUNCTION — 706

UPDATE THE MODEL BY REMOVING FILTERS FROM THE ORIGINAL SET OF FILTERS OF THE RISK PREDICTION MODEL — 708

ADJUST THE PARAMETERS OF THE UPDATED RISK PREDICTION MODEL TO MINIMIZE AN UPDATED LOSS FUNCTION — 710

END

MACHINE LEARNING MODELS WITH EFFICIENT FEATURE LEARNING

CROSS-REFERENCE TO RELATED APPLICATIONS

This claims the benefit and priority under 35 U.S.C. 119(e) of U.S. Provisional Application No. 63/231,631, filed Aug. 10, 2021 and titled "Repeated Measure Models," the contents of which are herein incorporated by reference.

TECHNICAL FIELD

The present disclosure relates generally to machine learning and artificial intelligence. More specifically, but not by way of limitation, this disclosure relates to machine learning models with efficient feature learning.

BACKGROUND

In machine learning, various models (e.g., artificial neural networks) have been used to perform functions such as providing a prediction of an outcome based on input values. These models can provide predictions with high accuracy because of their intricate structures, such as the interconnected nodes in a neural network. However, before these models can proceed, raw data has to be converted to features useful for modeling. Feature engineering is typically used to determine the features to be input to the machine learning models. But feature engineering requires careful consideration by subject matter experts which is time consuming and may not systematically and comprehensively cover all features useful for a given problem.

SUMMARY

Various aspects of the present disclosure provide systems and methods for determining risk for a target entity using a machine learning model with efficient feature learning. A risk prediction model can be applied to time-series data associated with a target entity to generate a risk indicator for the target entity. The risk prediction model can include a feature learning model configured to generate features from the time-series data. The risk prediction model can additionally include a risk classification model configured to generate the risk indicator based on the features generated by the feature learning model. The feature learning model can include a set of filters, and the risk prediction model can be trained via a training process. Parameters of the risk prediction model can be adjusted to minimize a loss function defined based on risk indicators generated for training time-series data and training risk indicators corresponding to the training time-series data. An updated risk prediction model can be generated by removing a filter from an original set of filters for the feature learning model based on influencing scores determined for the original set of filters. The original set of filters can include the set of filters in the trained feature learning model, and the influencing scores for the original set of filters can be determined based on the adjusted parameters. A responsive message including at least the risk indicator can be transmitted to a remote computing device for use in controlling access of the target entity to one or more interactive computing environments.

In other aspects, a system can include a processor and a non-transitory computer-readable medium including instructions that are executable by the processor to cause the processor to perform various operations. The system can apply a risk prediction model to time-series data associated with a target entity to generate a risk indicator for the target entity. The risk prediction model can include a feature learning model configured to generate features from the time-series data. The risk prediction model can include a risk classification model configured to generate the risk indicator based on the features generated by the feature learning model. The feature learning model can include a set of filters, and the risk prediction model can be trained via a training process. The system can adjust parameters of the risk prediction model to minimize a loss function defined based on risk indicators generated for training time-series data and training risk indicators corresponding to the training time-series data. The system can generate an updated risk prediction model by removing a filter from an original set of filters for the feature learning model based on influencing scores determined for the original set of filters. The original set of filters can include the set of filters in the trained feature learning model. The influencing scores for the original set of filters can be determined based on the adjusted parameters. The system can transmit, to a remote computing device, a responsive message including at least the risk indicator for use in controlling access of the target entity to one or more interactive computing environments.

In other aspects, a non-transitory computer-readable medium can include instructions that are executable by a processing device for causing the processing device to perform various operations. The operations can include applying a risk prediction model to time-series data associated with a target entity to generate a risk indicator for the target entity. The risk prediction model can include a feature learning model configured to generate features from the time-series data. The risk prediction model can include a risk classification model configured to generate the risk indicator based on the features generated by the feature learning model. The feature learning model can include a set of filters, and the risk prediction model can be trained via a training process. The operations can further include adjusting parameters of the risk prediction model to minimize a loss function defined based on risk indicators generated for training time-series data and training risk indicators corresponding to the training time-series data. The operations can further include generating an updated risk prediction model by removing a filter from an original set of filters for the feature learning model based on influencing scores determined for the original set of filters. The original set of filters can include the set of filters in the trained feature learning model, and the influencing scores for the original set of filters can be determined based on the adjusted parameters. The operations can further include transmitting, to a remote computing device, a responsive message including at least the risk indicator for use in controlling access of the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF DRAWINGS

FIG. 7 is a flow chart depicting an example of a process for training a risk prediction model with efficient feature learning, according to certain aspects of the present disclosure.

DETAILED DESCRIPTION

Figure 1:
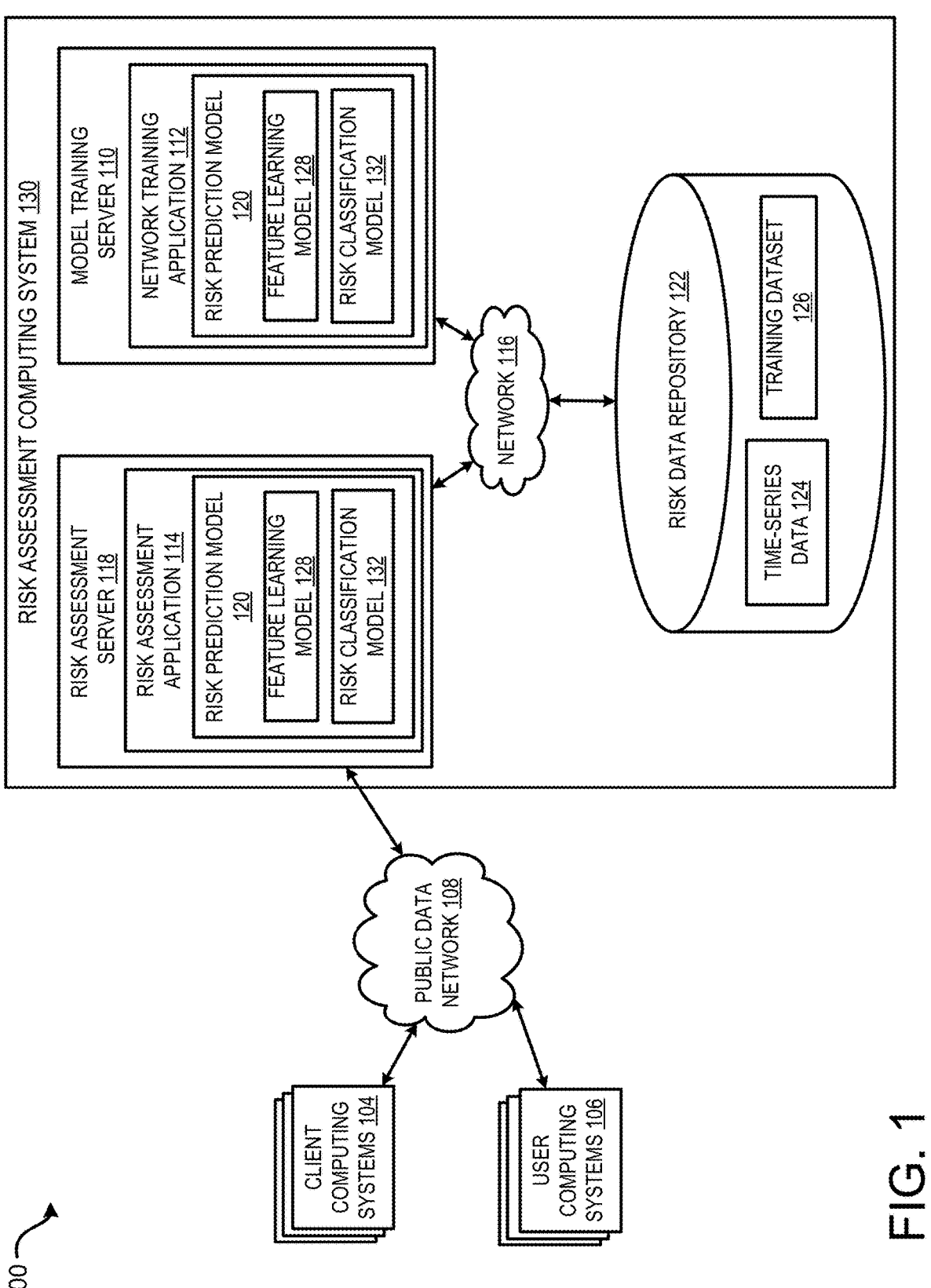
FIG. 1 is a block diagram depicting an example of a computing environment in which an efficient feature learning technology can be applied to extract representative features for a machine learning model, according to certain aspects of the present disclosure.

Certain aspects described herein are provided for risk prediction using machine learning models with efficient feature learning. Feature learning provides an alternative to feature engineering by using machine learning to extract features for machine learning models from raw data. Raw data poses a challenge to feature learning because raw data typically contain a large amount of data and the dimensionality of the extracted features can be very high. The high dimensionality of the extracted features leads to high complexity of the machine learning models. Efficient feature learning described herein reduces the dimensionality of the extracted features, thereby reducing the complexity of the machine learning models.

By using a risk prediction model with feature learning, a risk assessment computing system, in response to receiving a risk assessment query for a target entity, can generate a risk indicator for the target entity based on time-series data associated with the target entity. The risk prediction model can be applied to the time-series data to compute the risk indicator. The risk assessment computing system can transmit the risk indicator in a response to the risk assessment query. The risk indicator can be used by a remote computing system to control access of the target entity to one or more interactive computing environments.

For example, the risk prediction model can include a feature learning model and a risk classification model. The feature learning model can be based on a convolutional neural network configured to accept time-series data as input and output a feature vector. The feature learning model can include a set of filters used to extract the features for the risk classification model. The time-series data can be raw data of variables associated with the target entity. The time-series data instances can include repeated measures of the variables at different time points. For example, if a variable describes the amount of available storage space of a computing device, a time-series data of the variable can include 32 instances each representing the available storage space at 5:00 pm on each day for 32 consecutive days. The time-series data of the variable captures the changes of the attribute over time. The risk classification model can be a classification model, such as a neural network or a logistic regression model, configured to accept the feature vector as input and output a risk indicator for the target entity.

The training of the risk prediction model can include two stages: an initial stage and a refining stage. The initial stage of the training can involve adjusting the parameters of the risk prediction model based on training time-series data instances of the variables and risk indicator labels corresponding to the training time-series data instances. The adjustable parameters of the model can include the weights applied to the features by the risk classification model, the coefficients of the filters included in the feature learning model, and so on. For a neural network classification model, the parameters can also include the connections among the nodes in different layers, the number of nodes in a layer of the network, the number of layers in the network, and so on. The parameters can be adjusted to optimize a loss function determined based on the risk indicators generated by the risk prediction model from the training time-series data instances and the risk indicator labels. The initial stage of the training can also determine the coefficients of the filters included in the feature learning model.

In the refining stage of the training, the risk prediction model is updated to remove filters from the feature learning model. To do so, influencing scores are calculated for the filters of the feature learning model. In some examples, filters of the feature learning model can include filters with different window sizes and can be organized as blocks of filters with each block containing filters of the same window size. An influencing score can be generated for each block of filters based on the weights associated with features generated by the block of filters. For example, the influencing score can be the L-2 norm of groups of weights on the inputs of the risk prediction model corresponding to the features generated by a filter block. The block of filters having an influencing score or a metric calculated based on the influencing score lower than a threshold can be removed from the feature learning model. Additionally, or alternatively, the influencing score can be calculated for each filter (e.g., as the L-2 norm of the weights associated with the filter) and removal of the filter is determined filter by filter based on the influencing score. The risk prediction model with the updated feature learning model may be retrained again using the training data to obtain the trained risk prediction model.

The trained risk prediction model can be used to predict risk indicators. For example, a risk assessment query for a target entity can be received from a remote computing device. In response to the assessment query, time-series data instances can be obtained for variables associated with the target entity. An output risk indicator for the target entity can be obtained by applying the risk prediction model to the time-series data instances of the variables associated with the target entity.

Certain aspects described herein, which can include operations and data structures with respect to the risk prediction model, improve existing technological processes involving machine-learning techniques and overcome the issues identified above. For instance, by allowing the model to learn features directly from the raw time-series data, features can be extracted from the input data based on the characteristics of the data, rather than human expertise. As such, the extracted features are more predictive and inherent to the data. Additionally, removing less influencing filters from the feature learning model based on the model parameters learned from the data itself allows the dimensionality of the features to be reduced without sacrificing the predictiveness of the model. As a result, the risk prediction model can provide a more accurate prediction while using less computational resources, such as CPU time and memory usage.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Machine-Learning Operations

Referring now to the drawings, FIG. 1 is a block diagram depicting an example of an operating environment 100 in which a risk assessment computing system 130 can build, train, and use a risk prediction model 120 to generate risk indicators for a target entity using efficient feature learning. FIG. 1 depicts examples of hardware components of a risk assessment computing system 130, according to some aspects. The risk assessment computing system 130 can be a specialized computing system that may be used for processing large amounts of data using a large number of computer processing cycles. The risk assessment computing system 130 can include a model training server 110 for building and training a risk prediction model 120. The risk prediction model 120 can include a feature learning model 128 and a risk classification model 132. The risk assessment computing system 130 can further include a risk assessment server 118 for performing a risk assessment, such as generating a risk indicator for a target entity, for given time-series data 124 using the trained risk prediction model 120.

The model training server 110 can include one or more processing devices that execute program code such as a network training application 112. The program code can be stored on a non-transitory computer-readable medium. The network training application 112 can execute one or more processes to train and optimize a model for predicting or generating risk indicators based on time-series data 124.

In some aspects, the network training application 112 can build and train the risk prediction model 120 utilizing a training dataset 126. The training dataset 126 can include multiple training vectors that include training time-series data and training risk indicator outputs corresponding to the training vectors. The training dataset 126 can be stored in one or more network-attached storage units on which various repositories, databases, or other structures are stored. An example of these data structures can include the risk data repository 122.

Network-attached storage units may store a variety of different types of data organized in a variety of different ways and from a variety of different sources. For example, the network-attached storage unit may include storage other than primary storage located within the model training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

The risk assessment server 118 can include one or more processing devices that execute program code, such as a risk assessment application 114. The program code can be stored on a non-transitory computer-readable medium. The risk assessment application 114 can execute one or more processes to utilize or execute the risk prediction model 120, or any suitable model thereof, trained by the network training application 112 to generate a feature vector via efficient feature learning and based on input time-series data 124. The feature vector can be generated by removing one or more filters from the feature learning model 128 to reduce the dimension of the feature vector. Additionally, the trained risk prediction model 120 can be utilized to generate risk indicators based on the determined feature vector for the input time-series data 124, or the like.

By utilizing efficient feature learning, the risk prediction model 120 can use fewer computing resources to generate the risk indicator for the target entity. For example, a lesser amount of computer memory may be used by the risk prediction model 120 to generate the risk indicator. A reduction of computer memory used by the risk prediction model 120 can involve a reduction in an amount of memory used to store the risk prediction model 120, a reduction in an amount of memory used to store features or feature vectors generated by the risk prediction model 120, and the like.

Furthermore, the risk assessment computing system 130 can communicate with various other computing systems, such as client computing systems 104. In some examples, the client computing systems 104 may send risk assessment queries to the risk assessment server 118 for risk assessment, may send signals to the risk assessment server 118 that control or otherwise influence different aspects of the risk assessment computing system 130, etc. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics interactions between the user computing system 106 and the client computing system 104 to be performed.

In some examples, a client computing system 104 may include other computing resources associated therewith (e.g., not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or may be performed through application programming interface (API) calls or web service calls.

A user computing system 106 can include any computing device or other communication device operated by a user, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, etc.

For instance, the user can use the user computing system 106 to engage in an electronic interaction with a client computing system 104 via an interactive computing environment. An electronic interaction between the user computing system 106 and the client computing system 104 can include, for example, the user computing system 106 being used to request online storage resources managed by the client computing system 104, acquire cloud computing resources (e.g., virtual machine instances), and so on. An electronic interaction between the user computing system 106 and the client computing system 104 can also include, for example, query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and interaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the user computing system 106 to certain features of the interactive computing environment.

In a simplified example, the system depicted in FIG. 1 can configure a risk prediction to be used for accurately determining risk indicators, such as credit scores, using time-series data.

Examples of time-series data used for predicting the risk associated with an entity accessing online resources include, but are not limited to, time-series data of the demographic characteristics of the entity (e.g., the revenue of the company over the past twenty-four consecutive months), time-series data of the prior actions or interactions involving the entity (e.g., past requests of online resources submitted by the entity over the past twenty-four consecutive months, the amount of online resource currently held by the entity over the past twenty-four consecutive months, and so on.), time-series data of the behavioral traits of an entity (e.g., the timeliness of the entity releasing the online resources over the past twenty-four consecutive months), etc. Similarly, examples of time-series data used for predicting the risk associated with an entity accessing services provided by a financial institute include, but are not limited to, time-series data of the demographic characteristics of an entity over a predefined period of time (e.g., income, etc.), time-series data of the prior actions or interactions involving the entity (e.g., information that can be obtained from credit files or records, financial records, consumer records, or other data about the activities or characteristics of the entity), time-series data of the behavioral traits of an entity over the past twenty-four consecutive months, etc. For example, time-series data for an account balance feature can include the account balance for the past thirty-two consecutive months.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the model training server 110 and the risk assessment server 118, may be instead implemented in a single device or system.

Examples of Operations Involving Machine-Learning

Figure 2:
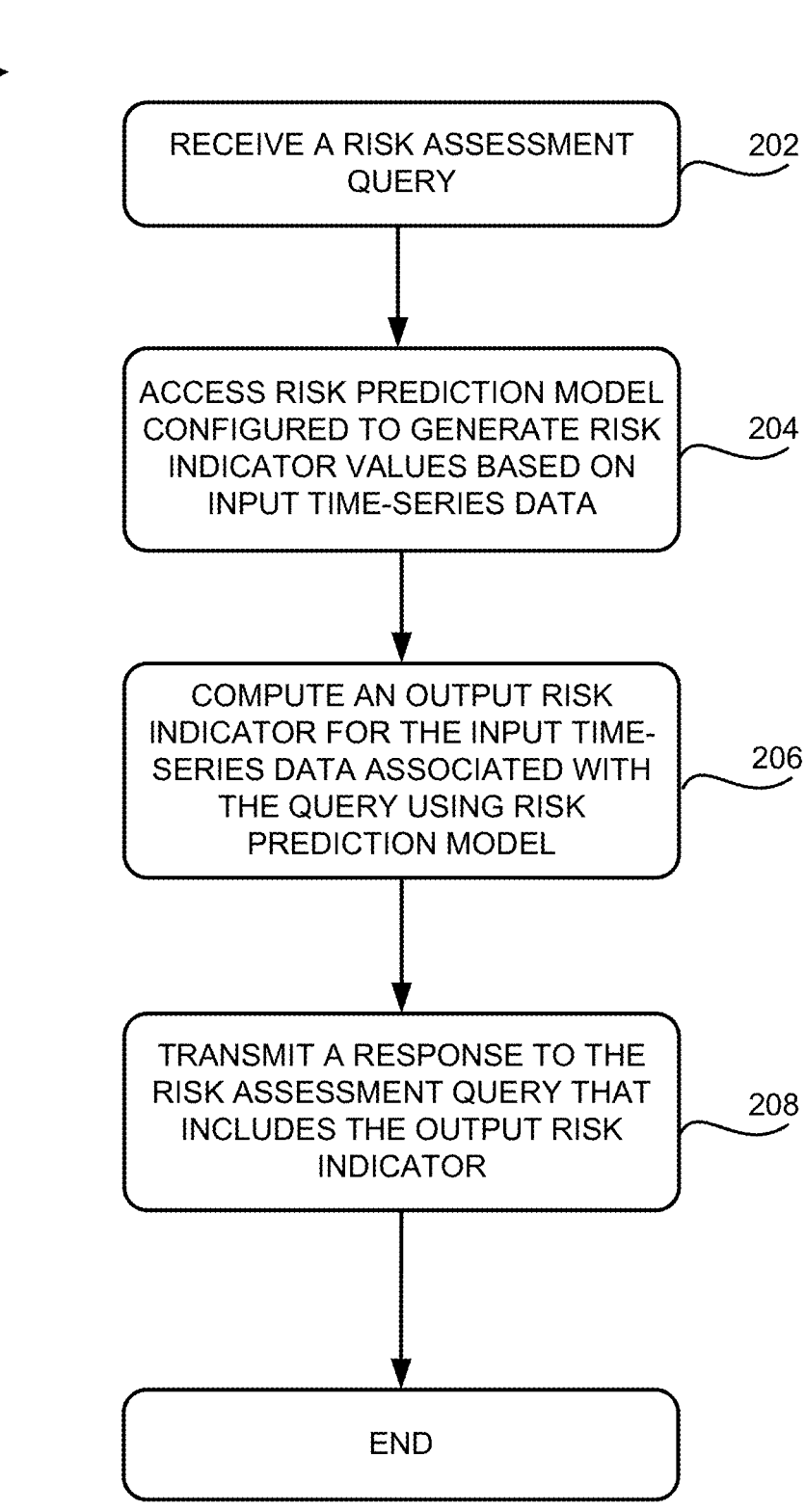
FIG. 2 is a flow chart depicting an example of a process for utilizing a machine learning model trained with efficient feature learning to generate risk indicators for a target entity, according to certain aspects of the present disclosure.

FIG. 2 is a flow chart depicting an example of a process 200 for utilizing a machine learning model trained with efficient feature learning to generate risk indicators for a target entity, according to certain aspects of the present disclosure. One or more computing devices (e.g., the risk assessment server 118) can implement operations depicted in, or described with respect to FIG. 2 by executing suitable program code such as the risk assessment application 114, etc. For illustrative purposes, the process 200 is described with reference to certain examples depicted in the figures. Other implementations, however, are possible.

At block 202, the process 200 involves receiving a risk assessment query for a target entity from a remote computing device, such as a computing device associated with the target entity requesting the risk assessment. The risk assessment query can also be received by the risk assessment server 118 from a remote computing device associated with an entity authorized to request risk assessment of the target entity.

At block 204, the process 200 involves accessing a risk prediction model 120 trained to generate risk indicator values based on input time-series data of variables or other data suitable for assessing risks associated with an entity. As described in more detail with respect to FIG. 1 above, examples of variables can include data associated with an entity that describes prior actions or interactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, time-series data for the variables can be obtained from credit files, financial records, consumer records, etc. The time-series data for the variables can be values for the features of a predefined period of time. For example, the time-series data can include financial records over a twelve-month period, behavioral traits over a twelve-month period, etc. The risk indicator can indicate a level of risk associated with the entity, such as a credit score of the entity.

The risk prediction model 120 can be constructed and trained based on training samples including training time-series data for variables and training risk indicator outputs (also referred to as "risk indicator labels"). The risk prediction model can include a feature learning model that receives time-series data for a variable and output features for the variable and a risk classification model that receives an output of the feature learning model and generates the risk indicator.

At block 206, the process 200 involves computing a risk indicator for the input time-series data associated with the risk assessment query using the risk prediction model 120. Time-series data of a variable associated with the target entity can be used as input to the risk prediction model 120. The time-series data associated with the target entity can be obtained from a database configured to store data associated with various entities such as the risk data repository 122. The output of the risk prediction model 120 can include the risk indicator for the target entity.

At block 208, the process 200 involves transmitting a response to the risk assessment query. The response can include the risk indicator generated using the risk prediction model 120. The risk indicator can be used for one or more operations that involve performing an operation with respect to the target entity based on a predicted risk associated with the target entity. In one example, the risk indicator can be utilized to control access to one or more interactive computing environments by the target entity. As discussed above with regard to FIG. 1, the risk assessment computing system 130 can communicate with client computing systems 104, which may send risk assessment queries to the risk assessment server 118 to request risk assessment. The client computing systems 104 may be associated with technological providers, such as cloud computing providers, online storage providers, or financial institutions such as banks, credit unions, credit-card companies, insurance companies, or other types of organizations. The client computing systems 104 may be implemented to provide interactive computing environments for customers to access various services offered by these service providers. Customers can utilize user computing systems 106 to access the interactive computing environments thereby accessing the services provided by these providers.

For example, a customer can submit a request to access the interactive computing environment using a user computing system 106. Based on the request, the client computing system 104 can generate and submit a risk assessment query for the customer to the risk assessment server 118. The risk assessment query can include, for example, an identity of the customer and other information associated with the customer that can be utilized to identify the time-series data. The risk assessment server 118 can perform a risk assessment based on time-series data associated with the customer and return the predicted risk indicator and explanatory data to the client computing system 104.

Based on the received risk indicator, the client computing system 104 can determine whether to grant the customer access to the interactive computing environment. If the client computing system 104 determines that the level of risk associated with the customer accessing the interactive computing environment and the associated technical or financial service is too high, the client computing system 104 can deny access by the customer to the interactive computing environment. Conversely, if the client computing system 104 determines that the level of risk associated with the customer is acceptable, the client computing system 104 can grant access to the interactive computing environment by the customer and the customer would be able to utilize the various services provided by the service providers. For example, with the granted access, the customer can utilize the user computing system 106 to access clouding computing resources, online storage resources, web pages or other user interfaces provided by the client computing system 104 to execute applications, store data, query data, submit an online digital application, operate electronic tools, or perform various other operations within the interactive computing environment hosted by the client computing system 104.

Examples of Model Architecture and Characteristics

Figure 3:
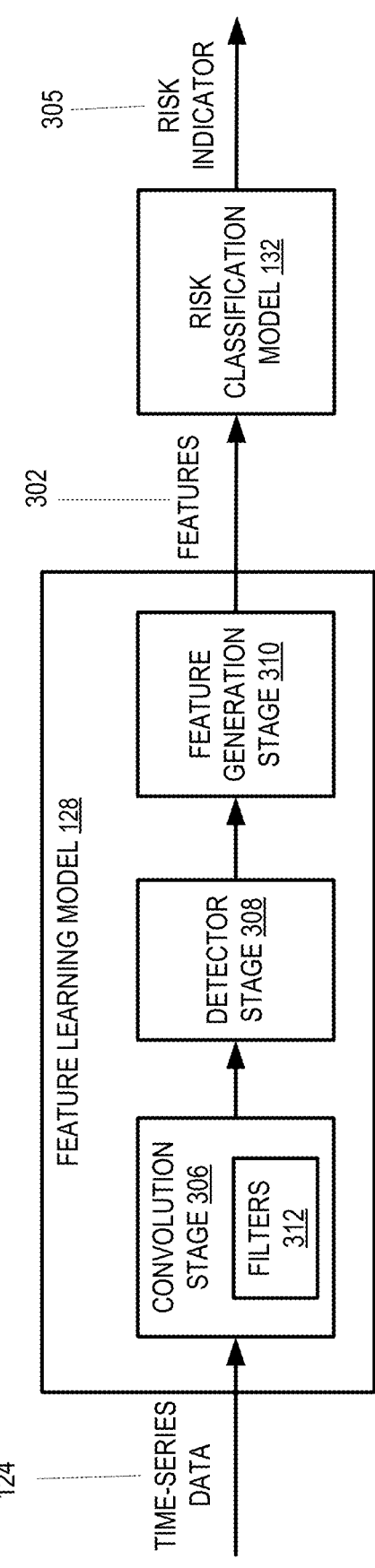
FIG. 3 is a diagram depicting an example of an architecture of a risk prediction model that includes a feature learning model and a classification model for risk prediction, according to certain aspects of the present disclosure.

FIG. 3 is a diagram depicting an example of an architecture of a risk prediction model 120 that can be generated and trained for risk prediction, according to certain aspects of the present disclosure. The risk prediction model 120 can include the feature learning model 128 and the risk classification model 132. In some examples, the feature learning model 128 can perform feature learning techniques, for example to generate features 302 such as a feature vector, based on time-series data 124 about the target entity, and the risk classification model 132 can output a risk indicator 305 for the target entity based on the features 302 determined by the feature learning model 128.

The feature learning model 128 can be configured to extract features from input data for improved classification of patterns in the input data. Input into the feature learning model 128 can include the time-series data 124 for the target entity measured on any desired time scale (e.g., daily, monthly, etc.) for any desired length (e.g., six months, one year, two years, etc.). For example, the time-series data 124 can correspond to a consumer's credit behavior over time, so the feature learning model 128 can extract features that provide improved classification of patterns in credit behavior data. In some examples, the time-series data 124 can correspond to the consumer's online interaction history over time, so the feature learning model 128 can extract features that provide improved classification of patterns in online interaction behavior (e.g., as malicious or not malicious, etc.).

The feature learning model 128 can include three stages: a convolution stage 306, a detector stage 308, and a feature generation stage 310 to provide features 302 (e.g., a feature vector) to the risk classification model 132. During training, parameters, such as weights, of the feature learning model are tuned. The convolution stage 306 involves one or more convolution filters 312. Each convolution filter 312 can have a parameter referred to a window size, which specifies the number of data instances involved in the convolution operation. For example, a convolution filter 312 with a window size of 2 inspects two samples from the time-series data at a time. Other suitable filter window sizes can be used. Additionally, the convolution stage 306 can involve multiple filters 312 having differing window sizes. For example, the convolution stage 306 can involve two, three, four, five, or more filters 312 having two, three, four, five, or more filter window sizes. The detector stage 308 utilizes an activation function to generate the signal for output. The activation function may be a sigmoid function, a rectified linear unit, or another suitable function. The feature generation stage 310 involves generating the features 302 for input into the risk classification model 132. The features 302 can include one feature vector, though more than one feature vector can be generated by the feature learning model 128 for input into the risk classification model 132. In some examples, the features 302 include a feature vector generated by concatenating or otherwise flattening output feature vectors from the filters 312 of the convolution stage 306.

The classification model 132 can be or otherwise include a neural network, a constrained neural network, a logistic regression model, other suitable models, or any suitable combination thereof. The classification model 132 can receive the features 302 from the feature learning model and can generate a risk indicator 305 for the target entity. As discussed with respect to FIG. 1, the risk indicator 305 can indicate a level of risk associated with the target entity, such as a credit score of the target entity. In some examples, the risk indicator 305 can indicate a level of risk associated with an online interaction of the target entity. For example, the risk indicator 305 can indicate a likelihood that the target entity is a malicious entity with respect to an online interaction or potential online interaction.

Figure 4:
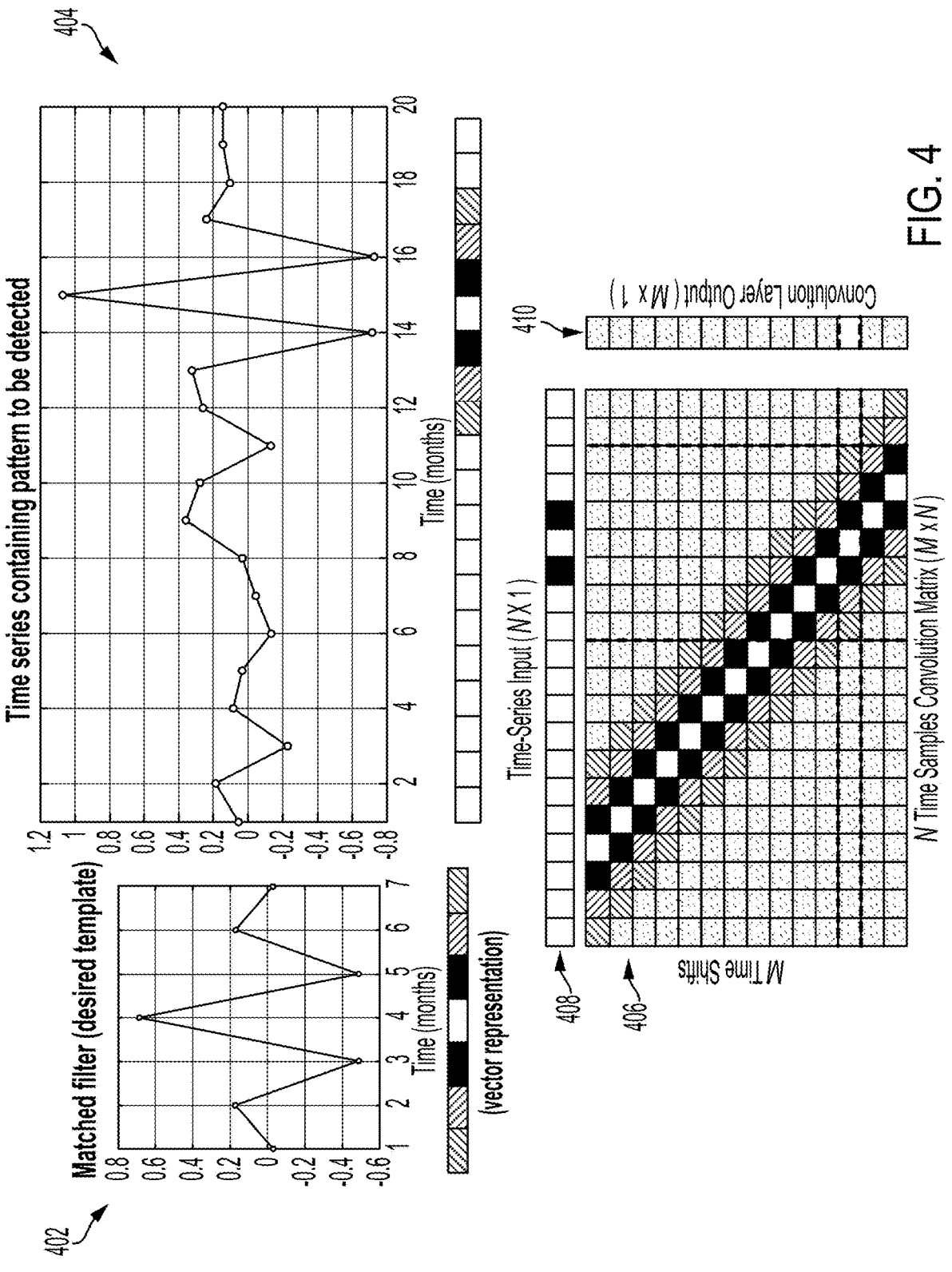
FIG. 4 is a diagram depicting an example of a convolution operation involved in the convolutional layer of the feature learning model of the risk prediction model, according to certain aspects of the present disclosure.

FIG. 4 is a diagram depicting an example of a convolution operation involved in the convolutional stage of the feature learning model 128 of the risk prediction model 120, according to certain aspects of the present disclosure. Graph 402 illustrates the coefficients of a filter that the feature learning model 128 has learned through training of the risk prediction model 120. A vector representation of the coefficients is also illustrated below the graph 402. The convolution operation looks for the pattern of the coefficients in an input time series, illustrated in graph 404, and determines whether the pattern occurs, to what degree the pattern occurs, and where the pattern occurs in time. A vector representation for the time series is also illustrated below the graph 404. Convolution can be viewed as a time-reversed cross-correlation function. The pattern is "slid" across the time series one sample at a time. At each time-shift, each point in the matched filter, corresponding to the pattern of the coefficients, is multiplied by the corresponding point in the time series and the results are summed. The pattern is shifted multiple times until it covers the time-series data, resulting in a single number for each shift. This is equivalent to treating the pattern and shifted sections (the same length as the filter) of the time series as vectors and taking the inner product of the vectors.

Matrix 406 illustrates the convolution operation as a vector-matrix multiplication, where the N×1 vector 408 corresponds to the input time series data with N samples, and the M×N matrix 406 consists of a set of M shifted versions of the pattern. Each row in the matrix 406 corresponds to a single shift in the convolution operation. A result of this product (shown as an M×1 vector 410) is presented to the detector stage (the activation functions), resulting in an output vector having the same length as the number of shifts.

In the convolutional stage, there may be only a single time step for each shift or multiple time steps for each shift. The size of the step is known as the stride of the convolutional layer. The effect of a stride greater than one is to downsample the incoming data to a lower time resolution.

Figure 5:
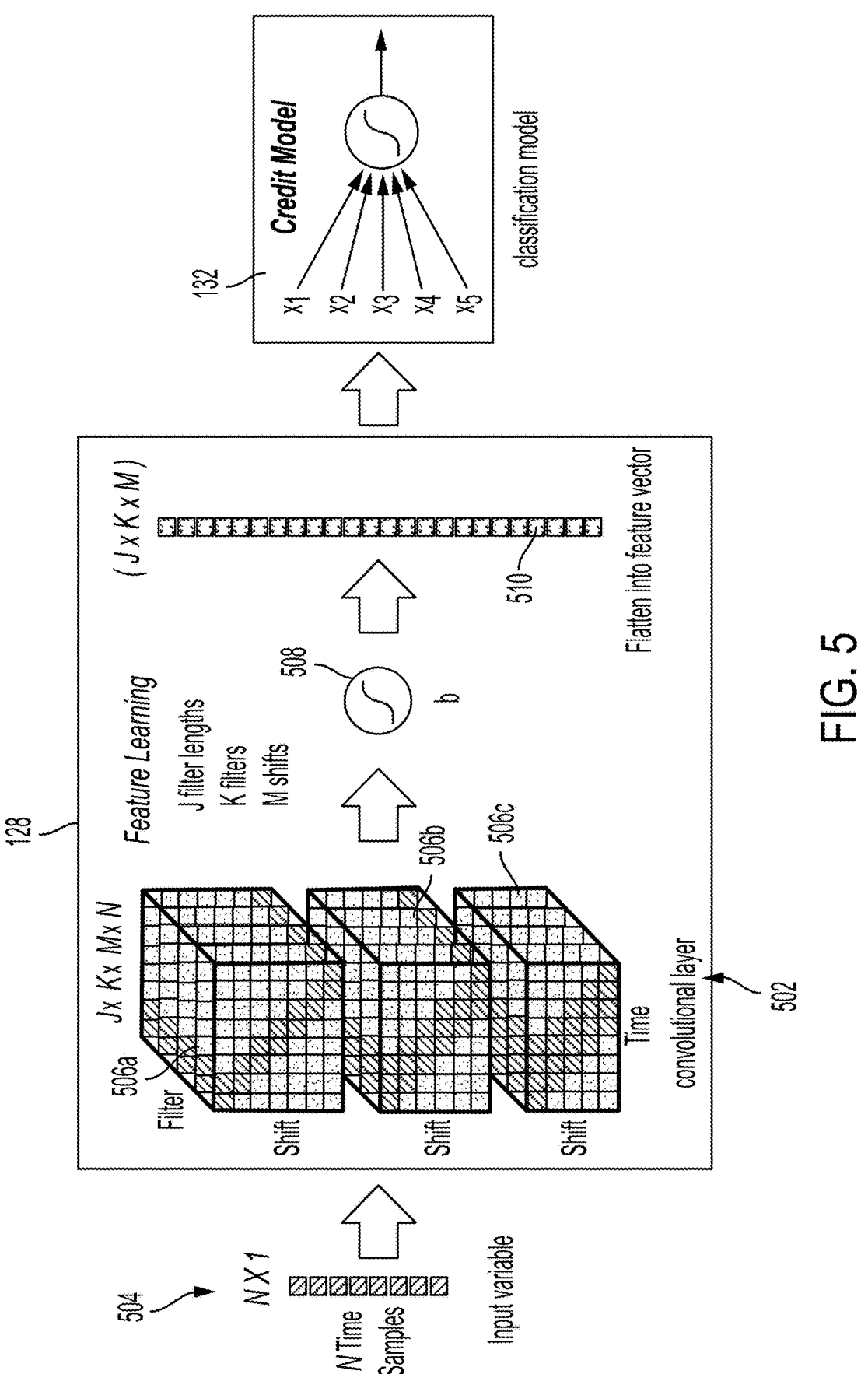
FIG. 5 is a diagram depicting examples of operations involved in the feature learning model of the risk prediction model, according to certain aspects of the present disclosure.

FIG. 5 is a diagram depicting examples of operations involved in the feature learning model 128 of the risk prediction model 120, according to certain aspects of the present disclosure. Input can be provided to a convolutional layer 502 of the feature learning model 128. The input can include N time samples 504, for example from or otherwise associated with time-series data 124 relating to the target entity. The time samples 504 can be time-lagged samples that include a single variable about the target entity. The time samples 504 can be provided to the convolutional layer 502 of the feature learning model 128, and the convolutional layer 502 can be configured with a tensor that is J×K×M×N where J is the number of window sizes (i.e., the number of filter blocks), K is number of filters in each block, and M corresponds to the number of shifts in each filter. The number of shifts M is related to the window size of the filter in that the number of shifts M is equal to N-window size. In some examples, the illustrated J×K×M×N tensor is representative of an operation that the convolution layer 502 undergoes for generating outputs for each filter included in the J×K×M×N tensor.

In some examples, the tensor can include one or more blocks, such as blocks 506a-c. Each block 506 in FIG. 5 can correspond to a given window size, each matrix in each block corresponds to a filter with the given window size, and each row in each matrix corresponds to a given shift. In some examples, each block includes multiple convolutional filters of varying filter coefficients. Each convolutional filter can be represented by a matrix. The variables can include a total balance on all accounts, a number of open accounts, a total high credit, a total past due amount, an online interaction history, and the like. In some examples, the time-series data 124 can be normalized prior to being input to the feature learning model 128 such that they each are made to have zero mean and a standard deviation of one over the respective time window.

Each matrix in each block can correspond to a unique feature learned by the feature learning model 128, where the coefficients represented by the shaded boxes are tunable parameters of the model and can be determined through training the risk prediction model 128.

In some examples, the convolution layer 502 can generate an output vector for each matrix included in each block 506 of the J×K×M×N tensor. For example, as illustrated, there are 15 matrices included in the J×K×M×N tensor, so the convolutional layer 502 can generate 15 output vectors 508 corresponding to the 15 filters included in the J×K×M×N tensor. The convolutional layer 502 can concatenate or otherwise flatten the output vectors 508. For example, the convolutional layer 502 can stack the output vectors 508 on top of one another to generate feature vector 510. Other suitable flattening or concatenation operations can be used to generate the feature vector 510 based on the output vectors 508. The feature vector 510 can be output by the convolutional layer 502 and can be transmitted to the risk classification layer 132 for generating the risk indicator 305 for the target entity.

Figure 6:
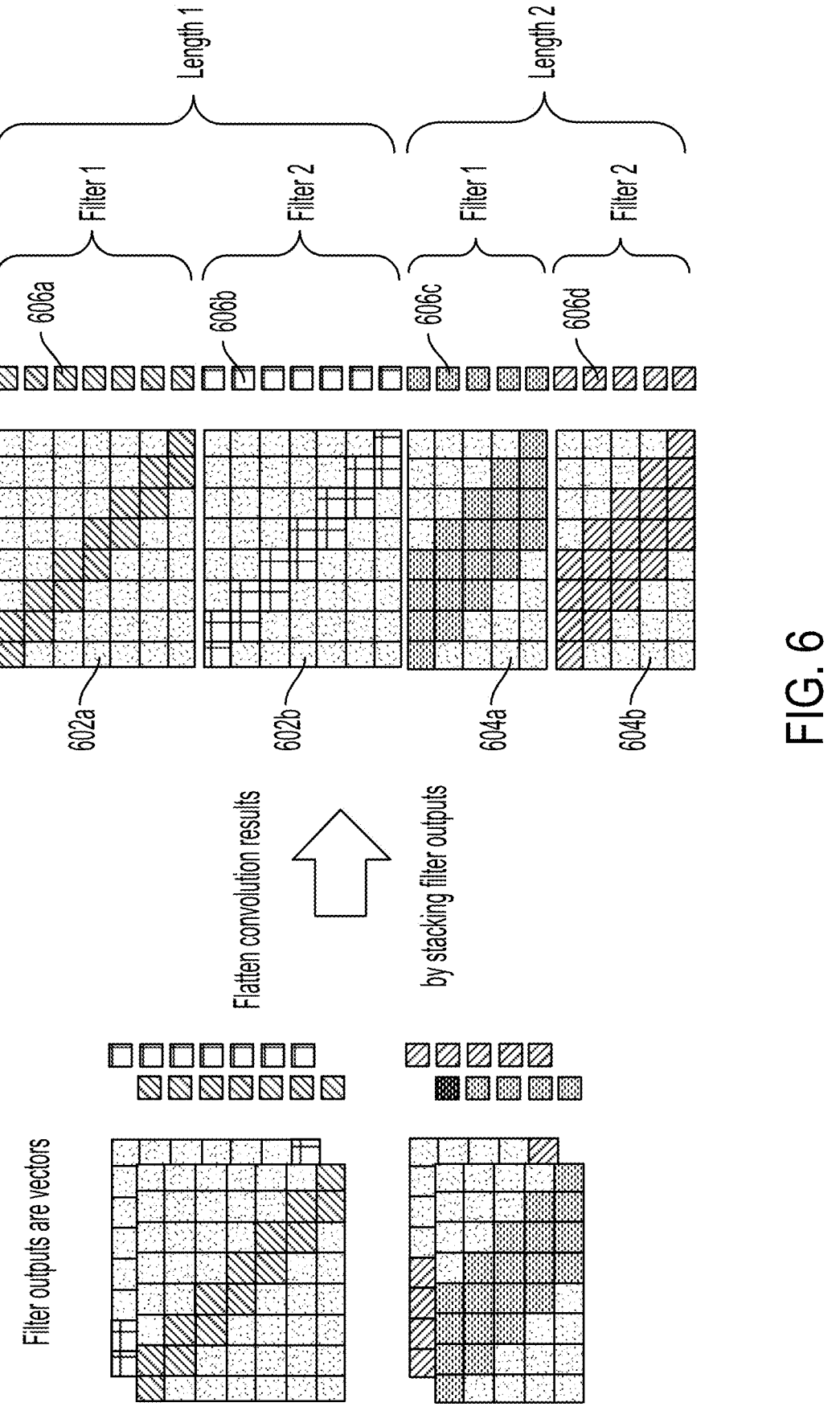
FIG. 6 is a diagram depicting a stacking operation involved in the feature learning model of the risk prediction model, according to certain aspects of the present disclosure.

FIG. 6 is a diagram depicting a stacking operation involved in the feature learning model 128 of the risk prediction model 120, according to certain aspects of the present disclosure. As illustrated, FIG. 6 is an example for a single variable with two window sizes and two filters per window size. For example, filters 602a-b have a window size of 2, and filters 604a-b have a window size of 4. The output of each convolutional filter can include a vector corresponding to each shift in the convolution operation. The convolution filter outputs by stacking these output vectors, as illustrated in FIG. 6.

As an example, the filters 602a-b may include a length of seven, and the filters 604a-b may include a length of five. The convolutional layer 502 of the feature learning model 128 can use the filters 602a-b and the filters 604a-b to generate output vectors 606a-d. The output vector 606a may be generated via the filter 602a and may be a 7×1 vector. The output vector 606b may be generated via the filter 602b and may be a 7×1 vector. The output vector 606c may be generated via the filter 604a and may be a 5×1 vector. The output vector 606d may be generated via the filter 604b and may be a 5×1 vector. The output vectors 606a-d can be stacked into a feature vector 608 for input into the risk classification model 132. For example, the output vector 606a can be stacked on top of the output vector 606b, which can be stacked on top of the output vector 606c, which can be stacked on top of the output vector 606c. Accordingly, the feature vector 608 can be a 24×1 vector that can be input into the risk classification model 132. In some examples, a dimensionality of the feature vector 608 can be reduced. For example, one or more filters, shifts (e.g., corresponding to rows of the feature vector 608), groups of filters, or other suitable entries in the feature vector 608 can be removed, ignored, or the like.

FIG. 7 is a flow chart depicting an example of a process 700 for training a risk prediction model 120 with efficient feature learning, according to certain aspects of the present disclosure. At block 702, the process 700 involves accessing training samples. The training samples can include training time-series data, training risk indicators, and other suitable training samples. The training time-series data can correspond to the training risk indicators. For example, the training time-series data can include data, such as online interaction behavior, credit behavior, and the like, about one or more target entities, and the training risk indicators can include one or more risk indicators, which may include a credit score, a behavior score, and the like, that correspond to the training time-series data. In some examples, the training samples include labeled data, unlabeled data, or a combination thereof.

At block 704, the process 700 involves determining an architecture of a risk prediction model 120. The risk prediction model 120 can include any suitable architecture for determining a predicted risk for the target entity. For example, the risk prediction model 120 can include a convolutional neural network, a time-delayed neural network, a logistic regression model, other suitable machine learning models, or any suitable combination thereof. In some examples, the risk prediction model 120 includes a feature learning model 128 and a risk classification model 132. For example, the feature learning model 128 can be or otherwise include a convolution-based model that can be trained and/or used to perform efficient feature learning operations on input time-series data for the target entity. Additionally, the risk classification model 132 can include a neural network or regression model that is configured to, based on output features from the feature learning model 128, generate risk indicators for the target entity. Any other suitable architecture for the risk prediction model 120 can be used.

At block 706, the process 700 involves adjusting parameters of the risk prediction model 120 to minimize a loss function. The parameters of the risk prediction model 120 can include weights applied to features by the risk prediction model 120, the coefficients of the filters included in the feature learning model 128, or any other suitable parameters for the risk prediction model 120. For a neural network risk prediction model 120, the parameters can also include the connections among the nodes in different layers, the number of nodes in a layer of the network, the number of layers in the network, and so on. The loss function can be defined based on the accessed training samples. For example, the loss function can be defined based on risk indicators generated for training time-series data and training risk indicators corresponding to the training time-series data, etc. The loss function can include a term defined based on an L-1 norm of the weights of the risk prediction model 120. As such, minimizing the loss function can involve suppressing the features that are associated with small weights and thus small contributions to the output risk indicators.

At block 708, the process 700 involves updating the risk prediction model 120 by removing filters from the original set of filters of the risk prediction model 120. The risk prediction model 120 can use the original set of filters to perform convolution operations on the accessed training data. For example, the training time-series data can be input into the risk prediction model 120, and the risk prediction model 120 can use the original set of filters to determine risk indicators based on the training time-series data. Based on the L-2 norm of the weights on the inputs of the risk prediction model corresponding to the features generated by the original set of filters, based on contributions of each filter to the risk indicators, and/or based on a comparison between the risk indicators generated by the risk prediction model 120 and the training risk indicators, one or more filters of the original set of filters can be removed from the risk prediction model 120.

For example, one or more influencing scores, which can be determined based on the adjusted parameters of the risk prediction model 120, can be determined corresponding to filters of the original set of filters. The influencing score for a particular filter of the original set of filters can be determined by calculating an L-2 norm of weights applied to the inputs of the risk prediction model corresponding to the features generated by a subset of the features generated via the filter. For example, the L-2 norm can be determined for at least one feature of a filter, and the L-2 norm can be used to determine the influencing score for the filter.

In some examples, two or more filters of the original set of filters can be grouped as a block (e.g., similar to the blocks 506a-c). An influencing score can be determined for each block of filters. For example, an L-2 norm of weights associated with individual filter in a block of filters can be determined, and the influencing score of the block of filters can be determined as a sum of the L-2 norms for the individual filters. The block, for example as-a-whole, can be removed from the risk prediction model 120 based on the influencing score for the block of filters. For example, if the influencing score is below a predetermined threshold, the corresponding block of filters may be removed from the risk prediction model 120. In another example, a block of filters may be removed if a metric calculated based on the influencing score (e.g., a ratio between the influencing score over a maximum influencing score) is below a predetermined threshold. Additional filters may be removed from the risk prediction model 120. An influencing score can be determined for the remaining block of filters, and the influencing score, or other suitable metric, can be used to remove a filter from the remaining block of filters. For example, the influencing score or other suitable metric based on the influencing score can be calculated for filters or groups of filters and these filters may be removed if the score or metric is lower than a predetermined threshold.

In an additional example, a shift within a filter can be removed. For example, a particular filter can include one, two, three, four, five, or more shifts that may depend on the number of instances in the input time-series data, the length (or window size) of the filter, and/or other suitable factors. As illustrated in FIGS. 5-6, each horizontal row in the matrix representation of the particular filter represents a shift of the filter. An L-2 norm, or other suitable metric, of the shift can be determined, and an influencing score for the shift can be determined. If the influencing score is less than or otherwise does not exceed a predetermined threshold, the shift may be removed from the filter and from the risk prediction model 120.

At block 710, the process 700 involves adjusting the parameters of the updated risk prediction model 120 to minimize an updated loss function. The risk prediction model 120 can be updated by removing filters, shifts, blocks of filters, etc., as described with respect to the block 708. The parameters, which can include weights applied to features by the risk prediction model 120, can be adjusted subsequent to removing the filters, the shifts, the blocks of filters, etc. For example, the parameters of the updated risk prediction model 120 can be further adjusted to minimize an updated loss function. The updated loss function can be defined based on the risk indicators generated for the training time-series data and the training risk indicators corresponding to the training time-series data. The parameters for the updated risk prediction model can otherwise suitably be updated based on the updated loss function.

Figure 8:
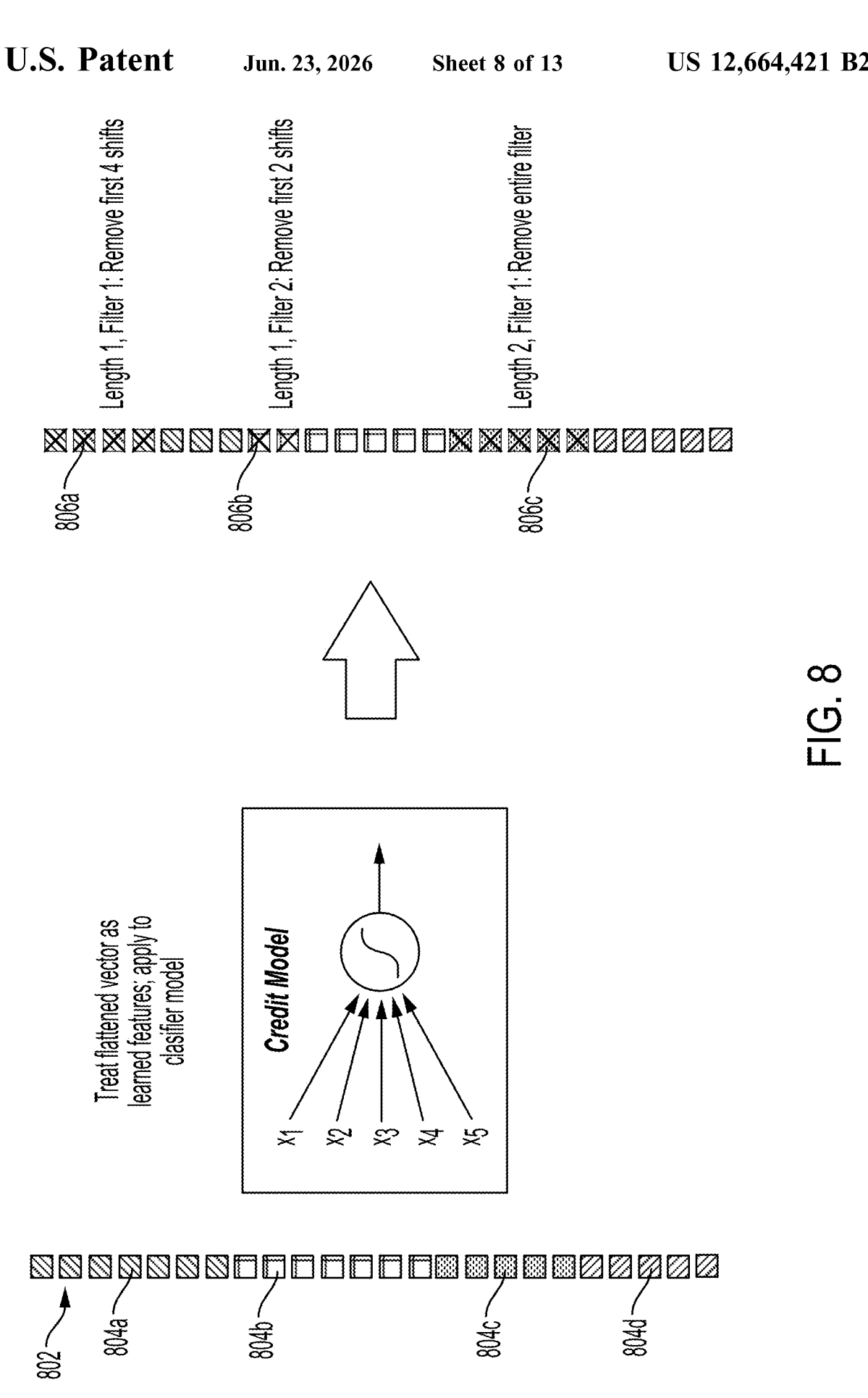
FIG. 8 is a diagram depicting a feature selection operation involved in the feature learning model of the risk prediction model, according to certain aspects of the present disclosure.

FIG. 8 is a diagram depicting a feature selection operation involved in the feature learning model 128 of the risk prediction model 120, according to certain aspects of the present disclosure. The feature selection operation can involve determining whether to remove one or more filters from a feature vector 802, how many filters to remove from the feature vector 802, and/or which filter to remove from the feature vector 802. The feature vector 802 can be determined by the feature learning model 128, and the feature vector 802 may be a concatenation or other suitable combination of output vectors from different filters included in an original set of filters of the risk prediction model 120. For example, the feature vector 802 can be a suitable combination of output vectors 804a-d.

In some examples, L-1 norms can be introduced in the loss function to drive weights corresponding to less or unimportant features to zero and then remove the irrelevant features in the feature vector 802 as described above. Additionally, or alternatively, the contribution of each feature to discriminatory power, in a bivariate analysis by ranking variables according to a metric such as, for example, Kolmogorov-Smirnof (KS), of the risk prediction model 120 can be determined. In some examples, filters or shifts with limited or negligible discriminatory power may be removed. As illustrated, four shifts 806a from the filters corresponding to the output vector 804a, two shifts 806b from the filters corresponding to the output vector 804b, and a filter 806c corresponding to the output vector 804c are removed according to the analysis based on L–1 norms or contributions to discriminatory power. Other suitable filters, shifts, and the like can be removed. In some examples, a simplified selection can be used to remove entire variables, filter lengths, or filters.

Figure 9:
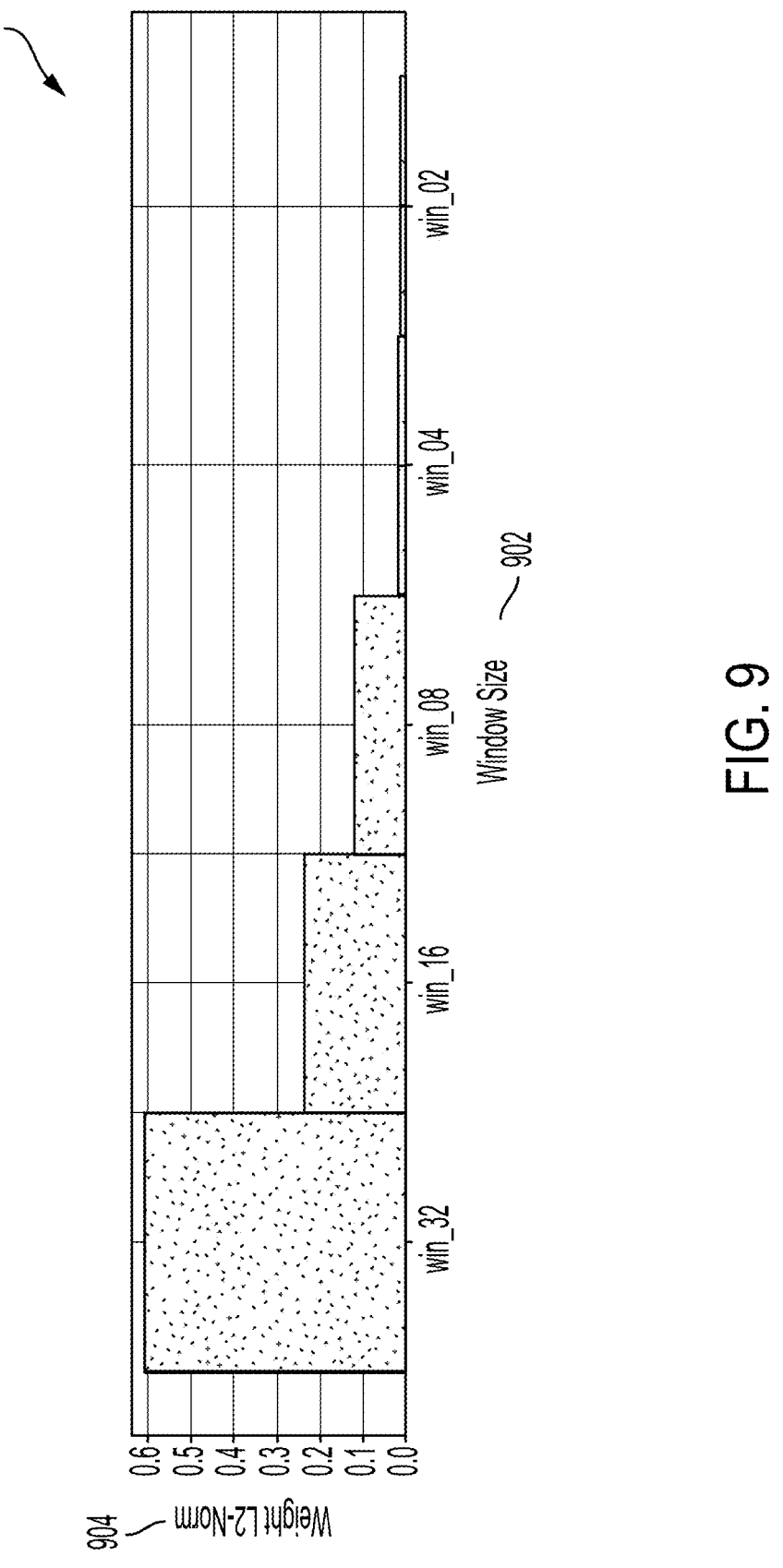
FIG. 9 is a diagram depicting examples of influencing scores for respective filter blocks, according to certain aspects of the present disclosure.

FIG. 9 is a diagram depicting examples of influencing scores for respective filter blocks, according to certain aspects of the present disclosure. As illustrated, FIG. 9 includes plot 900 that includes a horizontal axis 902 corresponding to window size and a vertical axis 904 corresponding to an L2-norm value determined for the respective window size. In some examples, the plot 900 represents L2-norm values for a block that includes filters with different window sizes, but the plot 900 can represent other objects such as shifts, filters themselves, or other suitable objects. As illustrated, the L2-norm values for window size 32 win_32, window size 16 win_16, and window size 8 win_08 are non-negligible since the value is not close to zero. Conversely, the L2-norm values for window size 4 win_04 and window size 2 win_02 are close to or approximately zero. Accordingly, the filters corresponding to win_04 and win_02 may be removed from the risk prediction model 120.

Figure 10A:
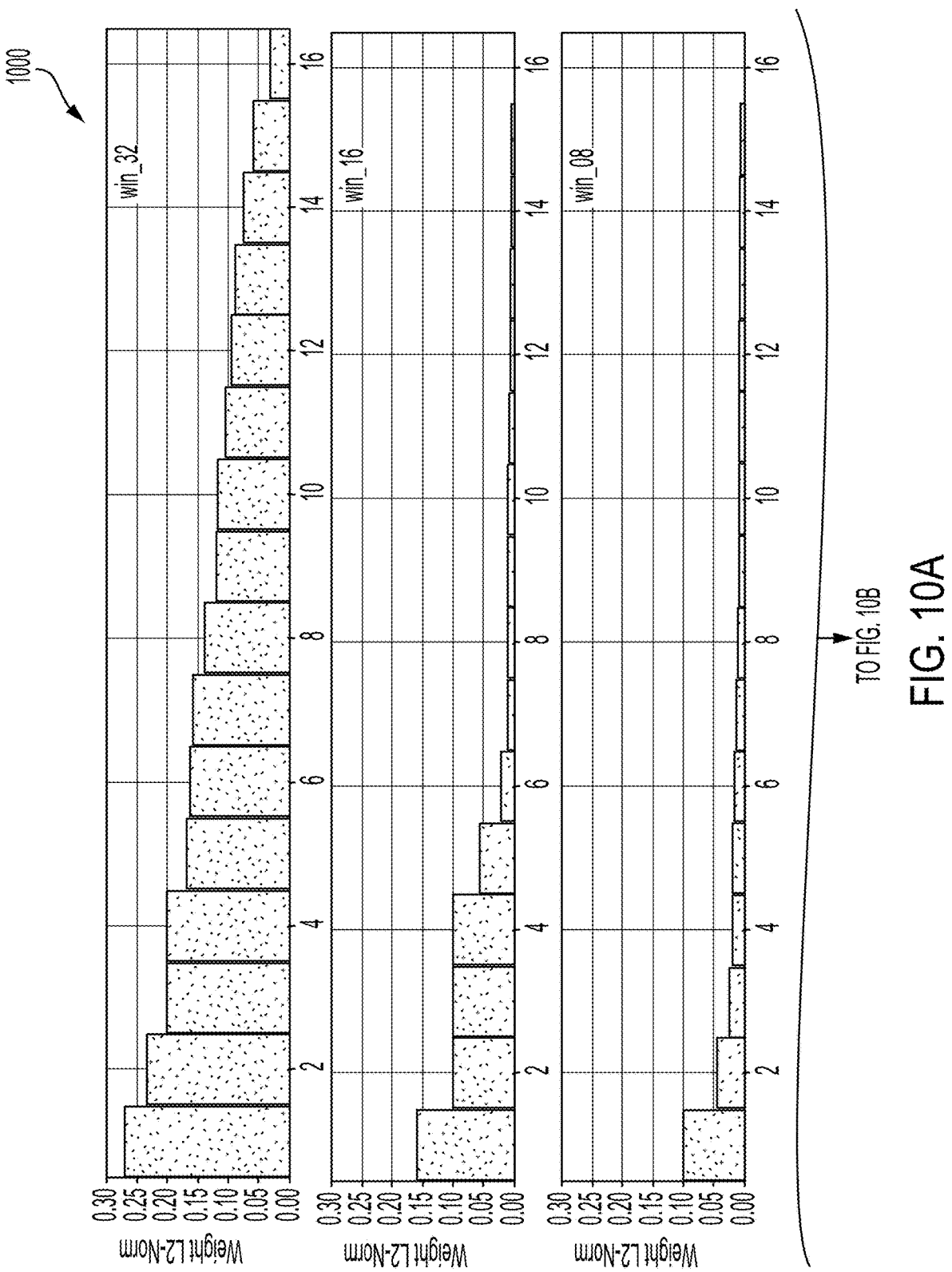
FIGS. 10A and 10B show a diagram depicting examples of influencing scores for individual filters in respective filter blocks, according to certain aspects of the present disclosure.
Figure 10B:
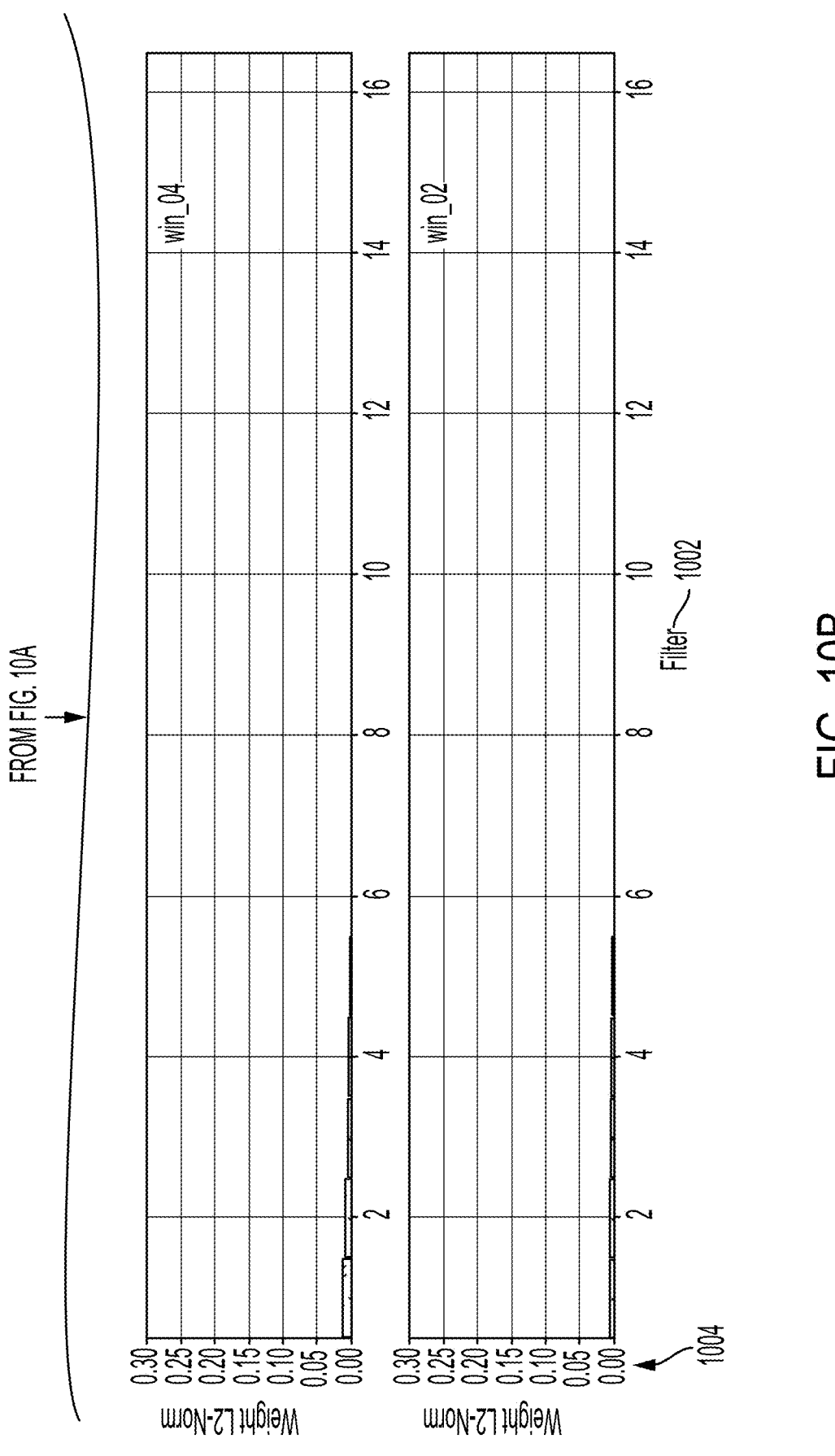

FIGS. 10A and 10B show a diagram depicting examples of influencing scores for individual filters in respective filter blocks, according to certain aspects of the present disclosure. As illustrated, FIGS. 10A and 10B includes a set 1000 of plots that each include a horizontal axis 1002 corresponding to a particular filter and a vertical axis 1004 corresponding to an L2-norm value determined for the respective filter. Each plot of the set 1000 of plots may correspond to a different window size. For example, from top-to-bottom, the set 1000 of plots can include a window size 32 win_32 plot, a window size 16 win_16 plot, a window size 8 win_08 plot, a window size 4 win_04 plot, and a window size 2 win_02 plot each corresponding to different window sizes for the filters. In some examples, the set 1000 of plots represent L2-norm values for filters of a block, but the plot 1000 can represent other objects such as shifts, filters themselves, or other suitable objects. As illustrated, the L2-norm values for the filters of the win_32 block and the win_16 block are non-negligible since each of the filters included therein include L-2 norm values that are not close to zero. Conversely, the L2-norm values for the filters of the win_04 block and the win_02 block are close to or approximately zero. Accordingly, the filters corresponding to the win_04 block and the win_02 block may be removed from the risk prediction model 120. Additionally, some filters of the win_08 block may be removed since some filters of the win_08 block may be negligible. The risk prediction model 120 may retain at least one filter (e.g., filters 1-4 or other suitable filters) from the win_08 block since the at least one filter may include a non-negligible L2-norm value.

Figure 11:
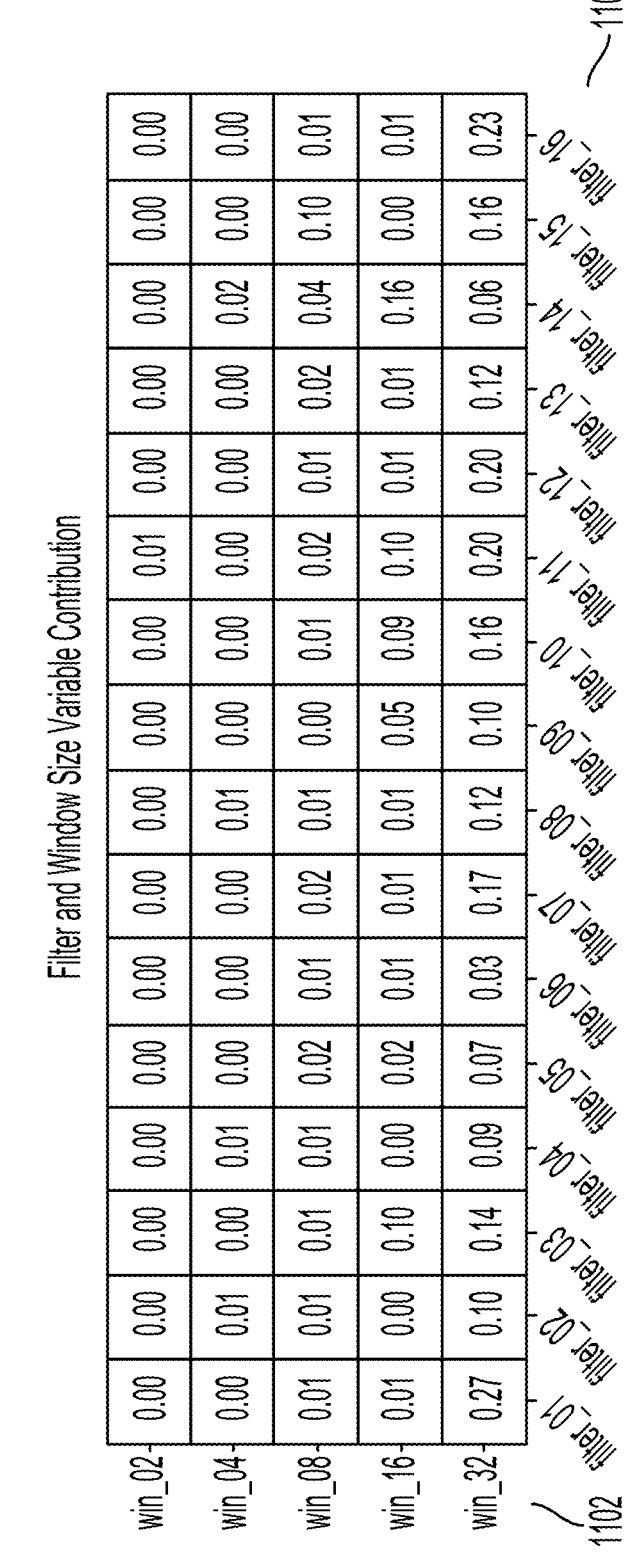
FIG. 11 is a diagram depicting an example of contributions from filters and windows involved in the feature learning model of the risk prediction model, according to certain aspects of the present disclosure.

FIG. 11 is a diagram that depicts an example of contributions from filters with different window sizes involved in the feature learning model 128 of the risk prediction model 120, according to certain aspects of the present disclosure. As illustrated, a table 1100 represents the Euclidean (L2) norm applied over shifts for each window size 1102 and filter 1104 for a given window size. Based on the table 1100, windows of size 2 and 4 samples (win_02 and win_04, respectively) may be irrelevant and the filters for those window sizes can be discarded. Although window size 8 and window size 16 include several filters with values close to 0, there are a few filters that appear to be relevant for classification, so the network can be pruned to those filters.

Further analysis could probe deeper and see if there are particular shifts that matter vs. those that are irrelevant.

Table 1 illustrates that removing one or more shifts, filters, filter blocks, or the like from the risk prediction model 120 does not affect the accuracy of the risk prediction model 120. Table 1 includes performance indicators for a full risk prediction model (e.g., without removing filters) and for a reduced risk prediction model (e.g., with removed filters). As can be seen from Table 1, while the reduced risk prediction model improves the functioning of a computing device, such via reduced computational resource (e.g., memory) usage, the Kolmogorov-Smirnof metric and Gini coefficient performance indicators for the reduced risk prediction model are similar to or even better than the full risk prediction model.

TABLE 1

| Model | KS | Gini |
|---|---|---|
| Full Model | 50 | 64 |
| Model with reduced filters | 52 | 67 |

Example of Computing System for Machine-Learning Operations

Figure 12:
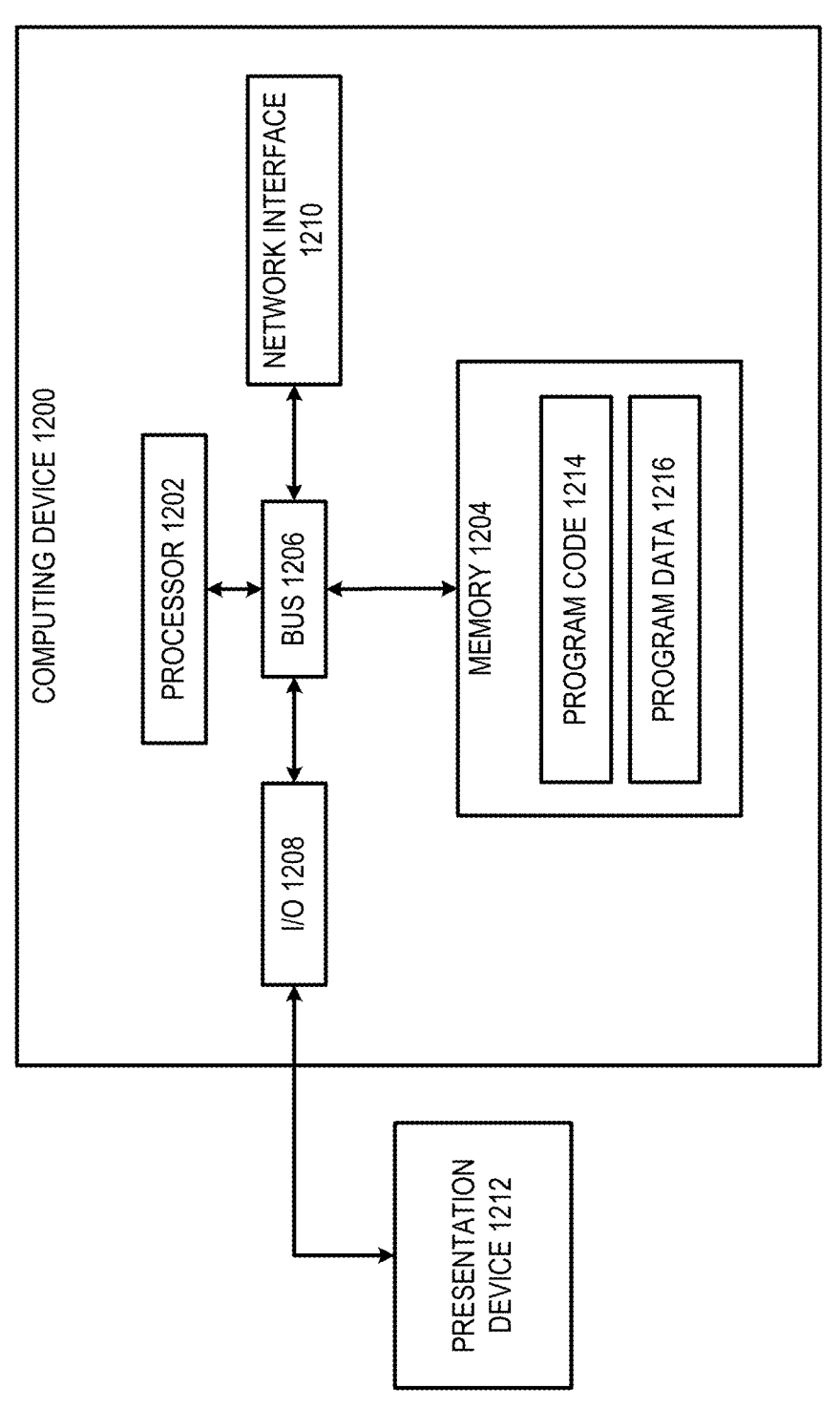
FIG. 12 is a block diagram depicting an example of a computing system suitable for implementing certain aspects of the present disclosure.

Any suitable computing system or group of computing systems can be used to perform the operations for the machine-learning operations described herein. For example, FIG. 12 is a block diagram depicting an example of a computing device 1200, which can be used to implement the risk assessment server 118 or the model training server 110, etc. The computing device 1200 can include various devices for communicating with other devices in the operating environment 100, as described with respect to FIG. 1. The computing device 1200 can include various devices for performing one or more operations described above with respect to FIGS. 1-11.

The computing device 1200 can include a processor 1202 that is communicatively coupled to a memory 1204. The processor 1202 executes computer-executable program code stored in the memory 1204, accesses information stored in the memory 1204, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 1202 include a microprocessor, an application-specific integrated circuit, a field-programmable gate array, or any other suitable processing device. The processor 1202 can include any number of processing devices, including one. The processor 1202 can include or communicate with a memory 1204. The memory 1204 stores program code that, when executed by the processor 1202, causes the processor to perform the operations described in this disclosure.

The memory 1204 can include any suitable non-transitory computer-readable medium. The computer-readable medium can include any electronic, optical, magnetic, or other storage device capable of providing a processor with computer-readable program code or other program code.

Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, Action-Script, etc.

The computing device 1200 may also include a number of external or internal devices such as input or output devices. For example, the computing device 1200 is shown with an input/output interface 1208 that can receive input from input devices or provide output to output devices. A bus 1206 can also be included in the computing device 1200. The bus 1206 can communicatively couple one or more components of the computing device 1200.

The computing device 1200 can execute program code 1214 that includes the risk assessment application 114 and/or the network training application 112. The program code 1214 for the risk assessment application 114 and/or the network training application 112 may be resident in any suitable computer-readable medium and may be executed on any suitable processing device. For example, as depicted in FIG. 12, the program code 1214 for the risk assessment application 114 and/or the network training application 112 can reside in the memory 1204 at the computing device 1200 along with the program data 1216 associated with the program code 1214, such as the time-series data for attributes 124 and/or the training dataset 126. Executing the risk assessment application 114 or the network training application 112 can configure the processor 1202 to perform the operations described herein.

In some aspects, the computing device 1200 can include one or more output devices. One example of an output device is the network interface device 1210 depicted in FIG. 12. A network interface device 1210 can include any device or group of devices suitable for establishing a wired or wireless data connection to one or more data networks described herein. Non-limiting examples of the network interface device 1210 include an Ethernet network adapter, a modem, etc.

Another example of an output device is the presentation device 1212 depicted in FIG. 12. A presentation device 1212 can include any device or group of devices suitable for providing visual, auditory, or other suitable sensory output. Non-limiting examples of the presentation device 1212 include a touchscreen, a monitor, a speaker, a separate mobile computing device, etc. In some aspects, the presentation device 1212 can include a remote client-computing device that communicates with the computing device 1200 using one or more data networks described herein. In other aspects, the presentation device 1212 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A method that includes one or more processing devices performing operations comprising:

applying a risk prediction model to time-series data associated with a target entity to generate a risk indicator for the target entity, wherein the risk prediction model comprises a feature learning model configured to generate features from the time-series data and a risk classification model configured to generate the risk indicator based on the features generated by the feature learning model, the feature learning model comprising a plurality of filters, and wherein the risk prediction model is trained via a training process comprising:

adjusting parameters of the risk prediction model to minimize a loss function defined based on risk indicators generated for training time-series data and training risk indicators corresponding to the training time-series data; and generating an updated risk prediction model by removing a filter from an original set of filters for the feature learning model based on influencing scores determined for the original set of filters, the original set of filters organized as blocks of filters and comprising the plurality of filters in the trained feature learning model, the influencing scores for the original set of filters determined based on the adjusted parameters, wherein removing the filter from the original set of filters further comprises determining an influencing score for a block of filters of the blocks of filters by computing a sum of the L-2 norm of weights applied to subsets of the features that are generated via the block of filters; and transmitting, to a remote computing device, a responsive message including at least the risk indicator for use in controlling access of the target entity to one or more interactive computing environments.

2. The method of claim 1, wherein the parameters of the risk prediction model comprise weights applied to the features by the risk classification model, and the loss function comprises a term defined based on an L-1 norm of the weights.

3. The method of claim 1, wherein removing a filter from the original set of filters comprises:

determining an influencing score for each block of the blocks of filters; and removing a block of filters based on the influencing scores for the blocks of filters.

4. The method of claim 3, wherein removing a filter from the plurality of filters further comprises:

determining an influencing score for each filter in one remaining block of filters; and removing a filter from the one block of filters based on the influencing score or a metric calculated from the influencing score being lower than a threshold.

5. The method of claim 4, wherein the influencing score for a filter is calculated by computing an L-2 norm of weights applied to a subset of the features that is generated via the filter.

6. The method of claim 3, wherein the blocks of filters comprise a first block of filters with a first window size and a second block of filters with a second window size.

7. The method of claim 6, wherein the first block of filters and the second block of filters have a same number of filters.

8. The method of claim 1, wherein the training process further comprises:

adjusting parameters of the updated risk prediction model to minimize an updated loss function defined based on the risk indicators generated for the training time-series data and the training risk indicators corresponding to the training time-series data.

9. A system comprising:

a processor; and a non-transitory computer-readable medium comprising instructions that are executable by the processor to cause the processor to perform operations comprising:

applying a risk prediction model to time-series data associated with a target entity to generate a risk indicator for the target entity, wherein the risk prediction model comprises a feature learning model configured to generate features from the time-series data and a risk classification model configured to generate the risk indicator based on the features generated by the feature learning model, the feature learning model comprising a plurality of filters, and wherein the risk prediction model is trainable via a training process comprising:

adjusting parameters of the risk prediction model to minimize a loss function defined based on risk indicators generated for training time-series data and training risk indicators corresponding to the training time-series data; and generating an updated risk prediction model by removing a filter from an original set of filters for the feature learning model based on influencing scores determined for the original set of filters, the original set of filters organized as blocks of filters and comprising the plurality of filters in the trained feature learning model, the influencing scores for the original set of filters determined based on the adjusted parameters, wherein removing the filter from the original set of filters further comprises determining an influencing score for a block of filters of the blocks of filters by computing a sum of the L-2 norm of weights applied to subsets of the features that are generated via the block of filters; and transmitting, to a remote computing device, a responsive message including at least the risk indicator for use in controlling access of the target entity to one or more interactive computing environments.

10. The system of claim 9, wherein the parameters of the risk prediction model comprise weights applied to the features by the risk classification model, and the loss function comprises a term defined based on an L-1 norm of the weights.

11. The system of claim 9, wherein removing a filter from the original set of filters comprises:

determining an influencing score for each block of the blocks of filters; and removing a block of filters based on the influencing scores for the blocks of filters.

12. The system of claim 11, wherein removing a filter from the plurality of filters further comprises:

determining an influencing score for each filter in one remaining block of filters, the influencing score determined by computing an L-2 norm of weights applied to a subset of the features that is generated via a particular filter; and removing the particular filter from the one block of filters based on the influencing score or a metric calculated from the influencing score being lower than a threshold.

13. The system of claim 11, wherein the blocks of filters comprise a first block of filters with a first window size and a second block of filters with a second window size, and wherein the first block of filters and the second block of filters have a same number of filters.

14. The system of claim 9, wherein the training process further comprises:

adjusting parameters of the updated risk prediction model to minimize an updated loss function defined based on the risk indicators generated for the training time-series data and the training risk indicators corresponding to the training time-series data.

15. A non-transitory computer-readable medium comprising instructions that are executable by a processing device for causing the processing device to perform operations comprising:

applying a risk prediction model to time-series data associated with a target entity to generate a risk indicator for the target entity, wherein the risk prediction model comprises a feature learning model configured to generate features from the time-series data and a risk classification model configured to generate the risk indicator based on the features generated by the feature learning model, the feature learning model comprising a plurality of filters, and wherein the risk prediction model is trainable via a training process comprising:

adjusting parameters of the risk prediction model to minimize a loss function defined based on risk indicators generated for training time-series data and training risk indicators corresponding to the training time-series data; and generating an updated risk prediction model by removing a filter from an original set of filters for the feature learning model based on influencing scores determined for the original set of filters, the original set of filters organized as blocks of filters and comprising the plurality of filters in the trained feature learning model, the influencing scores for the original set of filters determined based on the adjusted parameters, wherein removing the filter from the original set of filters further comprises determining an influencing score for a block of filters of the blocks of filters by computing a sum of the L-2 norm of weights applied to subsets of the features that are generated via the block of filters; and transmitting, to a remote computing device, a responsive message including at least the risk indicator for use in controlling access of the target entity to one or more interactive computing environments.

16. The non-transitory computer-readable medium of claim 15, wherein the parameters of the risk prediction model comprise weights applied to the features by the risk classification model, and the loss function comprises a term defined based on an L-1 norm of the weights.

17. The non-transitory computer-readable medium of claim 15, wherein removing a filter from the original set of filters comprises:

determining an influencing score for each block of the blocks of filters; and removing a block of filters based on the influencing scores for the blocks of filters.

18. The non-transitory computer-readable medium of claim 15, wherein the training process further comprises:

adjusting parameters of the updated risk prediction model to minimize an updated loss function defined based on the risk indicators generated for the training time-series data and the training risk indicators corresponding to the training time-series data.

* * * * *